(12) United States Patent
Weiss et al.

(10) Patent No.: US 6,618,800 B1
(45) Date of Patent: Sep. 9, 2003

(54) PROCEDURE AND PROCESSOR ARRANGEMENT FOR PARALLEL DATA PROCESSING

(75) Inventors: Matthias Weiss, Dresden (DE); Gerhard Fettweis, Dresden (DE)

(73) Assignee: Systemonic AG (DE)

( * ) Notice: Subject to any disclaimer, the term of this patent is extended or adjusted under 35 U.S.C. 154(b) by 0 days.

(21) Appl. No.: 09/484,776

(22) Filed: Jan. 18, 2000

(51) Int. Cl.$^7$ ............................................... G06F 13/00
(52) U.S. Cl. ........................................ 712/13; 711/153
(58) Field of Search ........................... 712/13; 711/112, 711/120, 129, 131, 149, 150, 153, 168, 205, 212

(56) References Cited

U.S. PATENT DOCUMENTS

| | | | | |
|---|---|---|---|---|
| 5,539,898 A | * | 7/1996 | Trevett et al. | 711/100 |
| 5,794,059 A | * | 8/1998 | Barker | 712/10 |
| 6,000,029 A | * | 12/1999 | Moyer et al. | 712/244 |
| 6,128,733 A | * | 10/2000 | Miyaguchi et al. | 713/1 |

OTHER PUBLICATIONS

C. Hansen, "Microunity's Media Processor Architecture," IEEE Micro, pp. 34–38, Aug. 1997.
"A New Scalable DSP Architecture for Mobile Communication Applications" by Weiss et al.;published at Australasian Computer Architecture Conference, Auckland, New Zealand; Jan. 18–21, 1999.
J. Hennessey, D. Patterson: *Computer Architecture: A Quantitative Approach*, Morgan Kaufmann Publishers Inc., 1990.
J. Golston, "Single–Chip H.324 Videoconfereencing", IEEE Micro, pp. 21–33 (Aug. 1996).

* cited by examiner

*Primary Examiner*—Eric Coleman
(74) *Attorney, Agent, or Firm*—Baker Botts LLP

(57) ABSTRACT

A procedure and a processor arrangement for parallel data processing in which data are read out from a data memory and are conveyed via a communications unit to processing units for parallel processing. The data are divided into data groups with several elements and are stored in a group memory under a common address. To each data group, a processing unit is allocated, in that at least one element of a data group can be directly linked to the allocated processing unit, directly bypassing the communications unit. In a parallel fashion, a data group is read out from the data memory and is distributed over one or several processing units and is processed in a parallel fashion in the latter.

12 Claims, 8 Drawing Sheets

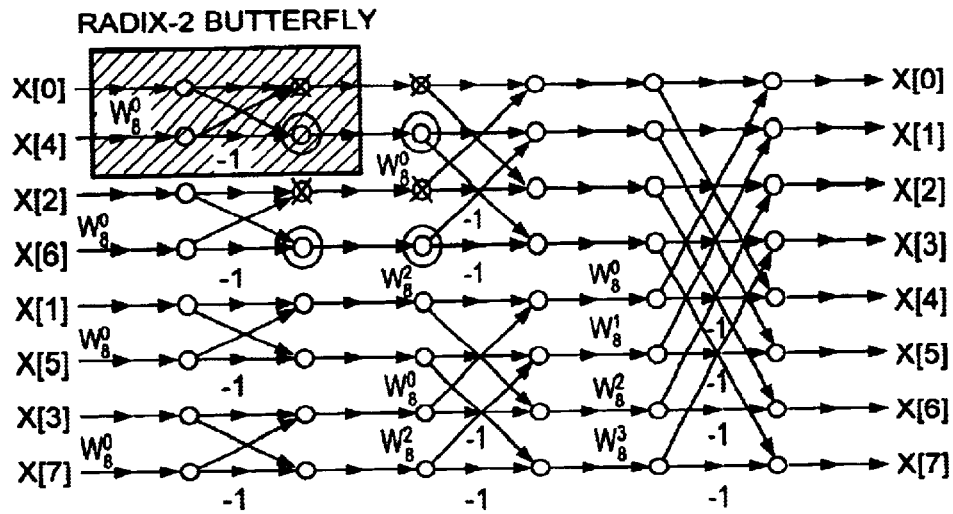
F I G. 2
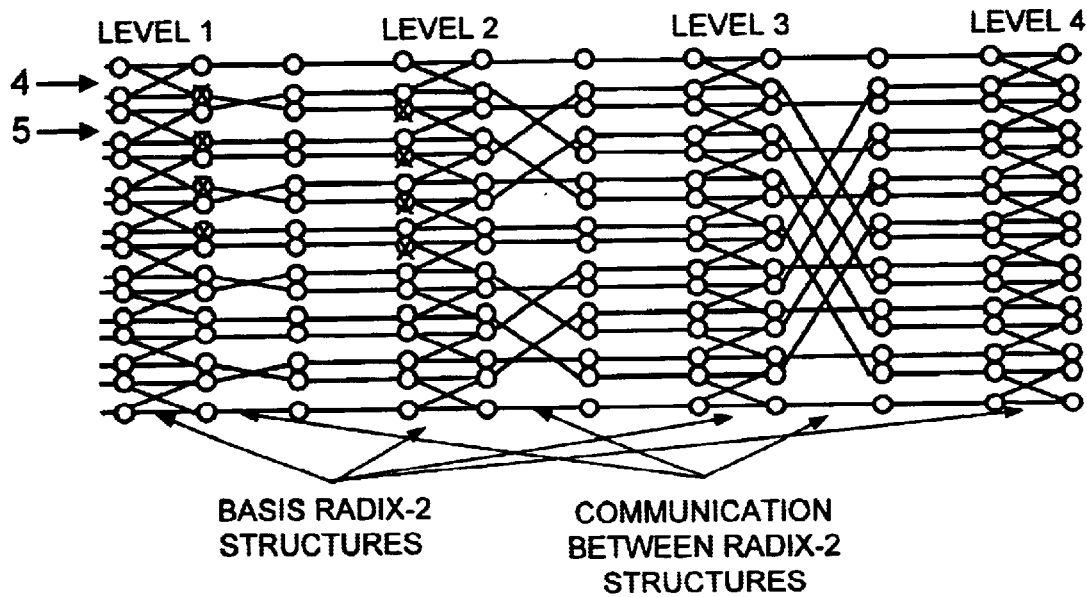
F I G. 3
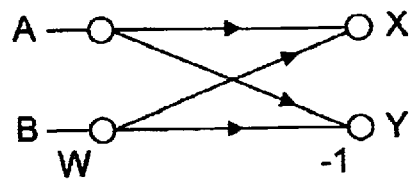
F I G. 4

| Cycle | 1 | 2 | 3 | 4 | 5 | 6 | 7 | 8 | 9 |
|---|---|---|---|---|---|---|---|---|---|
| Sch.1 | R1 | R2/R3 | R2/R3 | E1 | E2 | E3/W1 | W2 | | |
| Sch.2 | | | | R1 | R2/R3 | R2/R3 | E1 | E2 | E3/W1 |
| Sch.3 | | | | | | | R1 | R2/R3 | R2/R3 |

| Cycle | RA | RB | RC | Acc | RD |
|---|---|---|---|---|---|
| (4) R1; E1 | -/O | -/O | -/O | RA, RB, RC | RC |
| (5) R2/3; E2 | -/O | I/O | RD/O | RB, RC | RA |
| (6) R2/3; E3 | RD/O | I | | RA | |

| Bus | 0  | 1  | 2 | 3  | 4  | 5 | 6  | 7 | 8  | 9 | 10 | 11 | 12 | 13 | 14 | 15 |
|-----|----|----|---|----|----|---|----|---|----|---|----|----|----|----|----|----|
| 0   | 16 |    | 0 |    | 16 |   | 0  |   | 16 |   | 0  |    | 16 |    | 0  |    |
| 1   |    | 15 |   | 1  |    |   |    |   |    |   |    |    |    |    |    |    |
| 2   |    |    |   |    |    | 14|    | 2 |    |   |    |    |    |    |    |    |
| 3   |    |    |   |    |    |   |    |   |    | 13| 3  |    |    |    |    |    |
| 4   |    |    |   |    |    |   |    |   |    |   |    |    |    | 14 |    | 4  |
|     |    | 11 | 11|    |    | 11| 11 |   |    | 11| 11 |    |    | 11 | 11 |    |

| Zyklus | 1  | 2   | 3       | 4  | 5  | ... | 16  | 17  | 18      |
|--------|----|-----|---------|----|----|-----|-----|-----|---------|
| Sch.1  | Rc | RxI | RxII/E1 | E2 | E3 | ... | E15 | E16 |         |
| Sch.2  |    |     |         |    |    |     | Rc  | RxI | RxII/E1 |

PROCEDURE AND PROCESSOR ARRANGEMENT FOR PARALLEL DATA PROCESSING

FIELD OF THE INVENTION

The invention concerns a procedure for parallel data processing, in which data are read out from a data memory and are conveyed to processing units for parallel processing via a communications unit.

The invention also concerns a processor arrangement for parallel data processing, with a data memory and parallel data-processing units, which are connected to each other via a communications unit.

BACKGROUND OF THE INVENTION

Processors with parallel data processing are known, such as those described in the book by J Hennessey, D. Patterson: *Computer Architecture: A Quantitative Approach*, Morgan Kaufmann Publishers Inc., 1990. There, in order to achieve a parallel processing, the processing units of an architecture are designed in multiple fashion. For a simultaneous utilization of these parallel processing units, data must be conveyed to them in parallel. For that purpose, it may be necessary to design multiple data units. This requires either a multiprocessor system or else one must provide a common utilization of a data memory by several processing units.

In these known arrangements, it is a disadvantage that, in a design with multiple processing units, one must either provide multiple data memories or else one must insert sets of intermediate registers which are capable of re-ordering their contents by means of a fully linked communications network. This in turn requires either structuring several address-generating units, e.g., memory ports, as well as the structuring of a connecting network between these memories, or else requires a full connecting network between the sets of registers.

For instance, a circuit of the firm Texas Instruments Inc., designated as C80/C82, is known, in which there are several address-generating units, memory ports, and a comprehensive connecting network. In each there are featured 4/2 digital-signal processor cores as well as a Reduced-Instruction-Set Computer, which are connected to a memory by means of a crossbar network.

Furthermore, from C. Hansen, *"Microunity's Media Processor Architecture,"* IEEE Micro, pp. 34–38, August 1997, a processor provided with a complete connecting network is known, in which the executing units are connected directly with the set of registers. Communications are carried out between two sets of registers and are provided by the general network.

OBJECTS AND SUMMARY OF THE INVENTION

It is an object of the invention to raise the degree of parallelization of a processor architecture without increasing the number of memories and/or the width of the connecting network.

This object is achieved in that the data, divided into data groups with several elements, are stored under one and the same address. A processing unit is allocated to each element of a data group, in that the element can be connected directly with the allocated processing unit, bypassing the communications unit. Simultaneously and in parallel, a data group is read out from the data memory, is divided up among several processing units, and is processed in parallel in these processing units.

For a data group to be read out from the data memory, it suffices that the address of this data group be called up. In that case, individual addressing of data elements can be omitted. Next, each data group can be conveyed either directly to the allocated processing unit or else can be distributed to other processing units with the aid of the communications unit. If several data were computed by the processing units, these can in turn be written into the data memory or else distributed via the communications unit.

The decision as to whether to convey the data group directly to the processing unit or whether to distribute it via the communications unit to other processing units depends on the object to be achieved. It is clear, however, that through the availability of the option to apply the data groups directly to allocated processing units, the communications unit undergoes a load reduction due to which it can be reduced in its width, hence in its cost.

One embodiment of the invention provides that data can be directly shifted from the processing units to mutually adjacent processing units. This direct shifting also causes a further decrease in the load of the communications unit, which promotes the reduction in its width.

In an embodiment of a method according to the invention, it is provided that elements of a data group are distributed via the communications unit to one or several processing units.

Before processing the elements of a data group in the processing units, the elements can be delayed by one step—i.e., until the arrival of a new element, in a following step. In this fashion, one can finish the treatment of the data from the preceding step in the processing units such that finished data are then available at the output of the processing units when the processing computation of the current elements of the data group is concluded. In the meantime, the data at the processing unit—i.e., the results of the preceding step—can be used by other processing units or else can be written back into the data memory.

The task is solved in an architecture where the data memory is designed as a group memory. In the group memory, at least one data group with several elements is stored under one address. The communications unit is designed as an overall communications unit. This means that the overall communications unit features a width which is less than the number of elements in one data group. The data memory is linked directly with the overall communications unit. To each element of the data group is allocated a part of the overall communications unit and a processing unit, which consists of a number of process units and an number of memory units.

This allocated part of the overall communications unit and of the processing unit are arranged in a strip. This strip is adjacent to other strips of the same structure. In the width of one element of a data group within a strip, the data memory is directly connected with the memory elements of an allocated processing unit.

By means of this arrangement, it is possible to either feed data elements of a data group directly to an allocated processing unit, or else to distribute them via the communications unit to other processing units. This is also supported geometrically by the stripwise allocation of elements of the data group, part of the overall communications unit and processing unit; this makes it possible to design the communications unit as an overall communications unit with a reduced width, compared to the prior art.

In those cases in which there are very frequent communications between the data memory and the allocated processing unit, such communication can be carried out via a direct link. The greater the proportion of these direct connections, the greater the possible reduction in the width of the overall communication unit. In a further embodiment, local communications units are provided and arranged between the processing units of adjacent strips. These local communications units feature a width which is at least one (1) and is at most equal to twice the number of memory elements in a processing unit.

By way of the local communications units, data of mutually adjacent processing units can be exchanged—in particular, processing results—without having to use the overall communications unit for that purpose. This makes an additional contribution to the load reduction of the overall communications unit, and makes it possible to design this overall communications unit in a narrower fashion.

In a further embodiment of the invention, it is provided that the memory elements are designed as registers.

In a simple structure of the circuit arrangement according to the invention, it is provided that the width of the overall communications unit is equal to 0. In that case, the data memory is designed as a group memory, in that at least one data group with several elements is stored under one address. To each element of the data group is allocated a processing unit, consisting of a number of process units and a number of memory units. The latter are arranged in a strip which is adjacent to other strips with the same structure. The data memory is directly connected with the memory elements of an allocated processing unit, in the width of one element of one data group, within the strip.

These and other objects and advantages will become apparent from the description of preferred embodiments in connection with the drawings.

BRIEF DESCRIPTION OF THE DRAWINGS

FIG. 2 is a flow graph with an 8-point Fast Fourier Transform (FFT) with a decimation-in-time core;

FIG. 3 is a flow graph of a 16-point FFT, with a parallel butterfly;

FIG. 4 is a schematic representation of a structure of a radix-2 butterfly;

DETAILED DESCRIPTION OF PREFERRED EMBODIMENTS

A first embodiment of the present architecture is described in connection with an application of the Fast Fourier Transform (FFT) algorithm. This represents an efficient algorithm for the computation of a Discrete Fourier Transform (DFT). Such an algorithm supplies a discrete frequency spectrum of a discrete-time sequence of values. The return transformation is carried out by means of an inverse FFT which has the same structure of the FFT.

A number of different implementations of the FFT are known. The present exemplary of embodiment refers to the so-called radix-2 decimation-in-time, as proposed in 1969 by Kooley and Tukey. FIG. 2 shows such an implementation of a FFT.

The input data X are complex values which in turn consist of two real values. In each case, M/2 complex values or M real values—i.e., M elements—are joined in a group.

Figure 1:
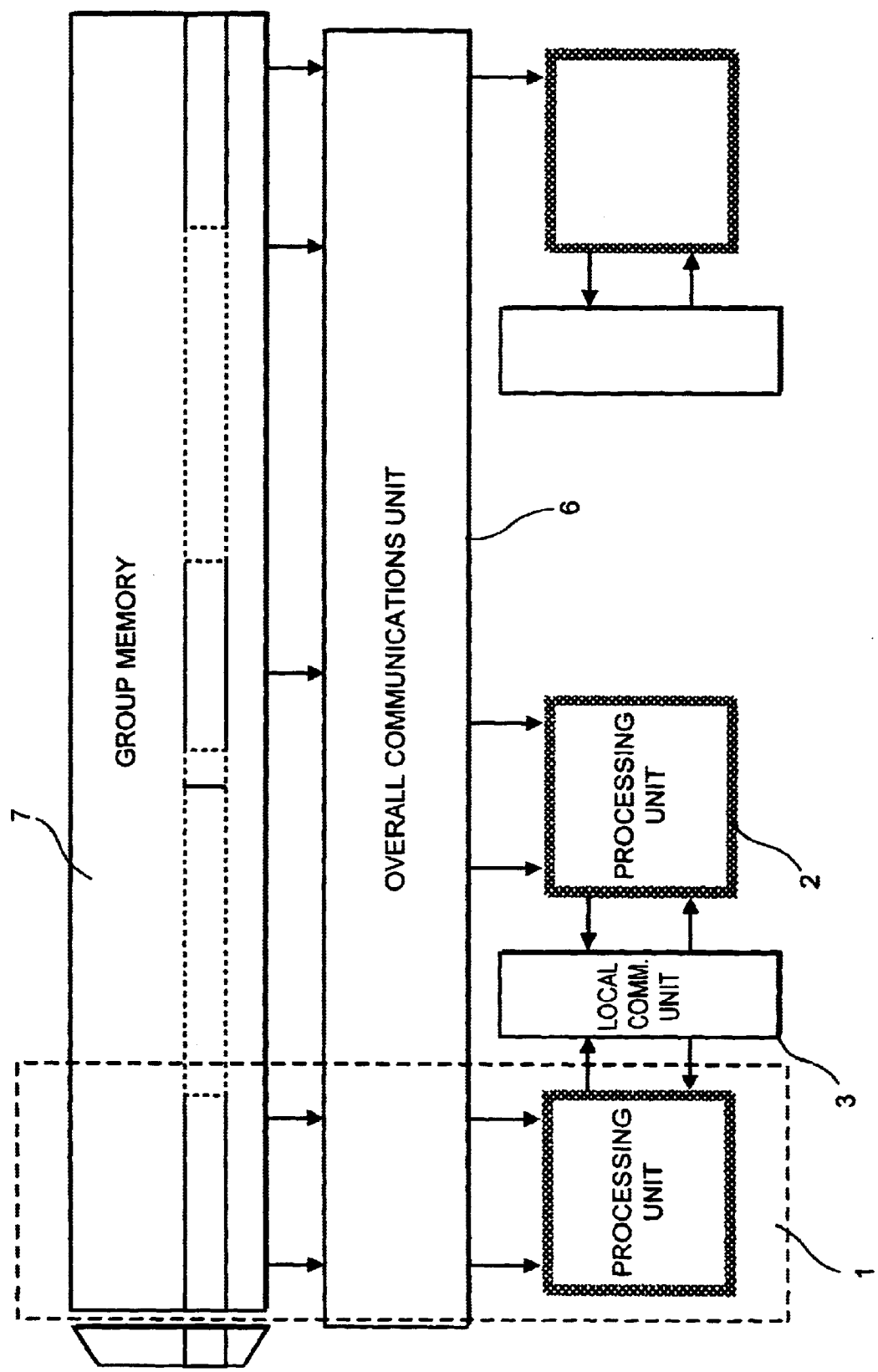
FIG. 1 is a schematic representation of a processor architecture according to the Invention.
Figure 8:
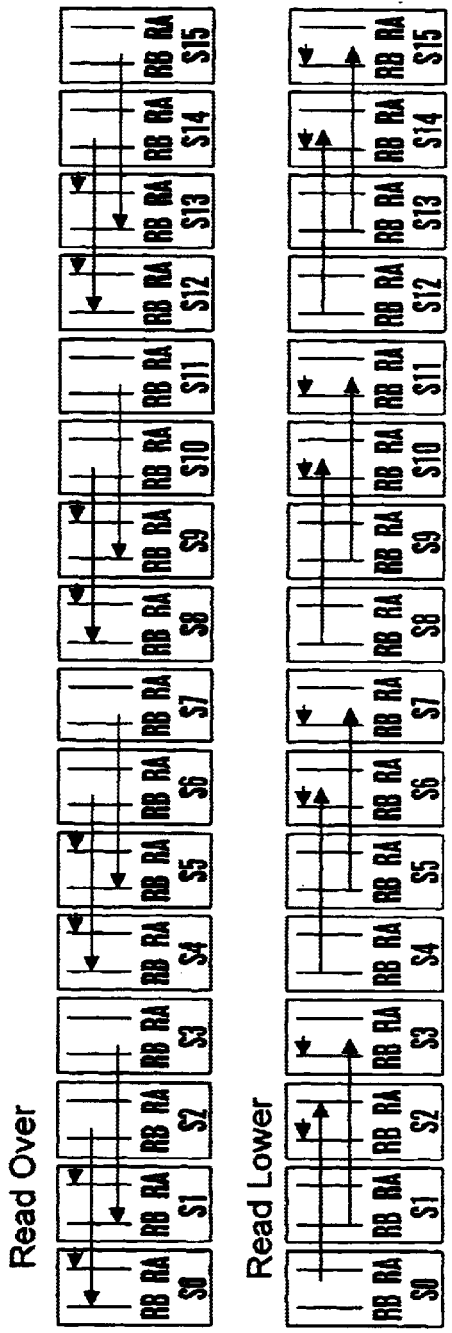
FIG. 8 is a representation of the required communications in stage 1.

As shown in FIGS. 1 and 8, in this example of embodiment one strip 1 contains one element and one processing unit 2. The processor 2, shown in more detail in FIG. 5, includes up of four registers (RA 502, RB 504, RC 506, and RD 508), one multiply-accumulate unit (hereinafter called MAC) 510, as well as one accumulator 512. Two of these strips make up a double strip 500. Within this double strip, both processing units 2 are connected with one local communications unit 3. Such a double strip can precisely compute a so-called radix-2 butterfly in seven steps. However, these steps can be carried out in overlapping fashion. Furthermore, a simultaneous computation of several butterflies is possible, as described below.

As shown in FIG. 2, a flow graph of a radix-2 FFT generally contains, in the case of N complex input values, log 2 (N) stages at N/2 radix-2 basic elements. Within a stage, the radix-2 elements are independent of each other and can thus be carried out in parallel—i.e., in independent strips. Without limitation to generality, N/2 double strips at two complex values each can thus operate in parallel to compute an N-point FFT.

In order to utilize the processing with an architecture as shown in FIG. 1, the input and output data for each butterfly are read and/or written not separately, but rather joined into groups. For that purpose, the flow graph according to FIG. 2 is shown in FIG. 3 in a manner such that for each stage all butterflies are parallel, while between the stages there are indicated the communications connections required for a re-ordering of the data.

As already stated, the combination can be carried out during the read or write of the group data. If during the write it is the upper outputs of the butterflies (marked in FIG. 3 with a circle) or the lower outputs of the butterflies (designated in FIG. 3 with a cross) which are joined into groups—which can be carried out for the computation of the basic butterfly structure, as explained below—these groups must be re-sorted when read in. Thus, the output values from butterfly 4 and butterfly 5 from stage 1 must both be executed on butterfly 4 in stage 2.

In general, one finds that M/2 elements each must be shifted with the aid of the overall communications unit 6, while the remaining M/2 data can be stored in the same strip 1, as read. Here, M is the number of elements in a group.

Inasmuch as this communication is different with each read access, both within one stage and between different stages, the overall communications unit 6 must be programmable. In general, for a group of data which is stored in the group memory 7, with M complex elements, M/2 communications must be carried out.

Thus for instance, if the group consists of eight complex elements, one needs four complex buses in the overall communications unit 6 for a complete communication.

The basic structure of a radix-2 butterfly shown in FIG. 2 has three complex inputs A, B, W, and two complex outputs, X and Y. The computation rule to be carried out consists of the following four equations:

$$X_{re} = A_{re} + W_{x, re} * B_{re} - W_{x, im} * B_{im}$$

$$X_{im} = A_{im} + W_{x, re} * B_{im} + W_{x, im} * B_{re}$$

$$Y_{re} = A_{re} - W_{x, re} * B_{re} + W_{x, im} * B_{im}$$

$$Y_{im} = A_{im} - W_{x, re} * B_{im} - W_{x, im} * B_{re}$$

This computation rule contains eight real multiplications as well as twelve additions. If two multiply-accumulate units are available for processing, the four equations can be computed in the following partial steps:

1. $X_{re} = A_{re} + W_{x,re} * B_{re}$  ||  $X_{im} = A_{im} + W_{x,re} * B_{im}$
2. $X_{re} = X_{re} - W_{x,im} * B_{im}$  ||  $X_{im} = X_{im} + W_{x,re} * B_{re}$
3. $Y_{re} = 2 * A_{re} - X_{re}$  ||  $Y_{im} = 2 * A_{im} - X_{im}$

Figures 5, 6, 7:
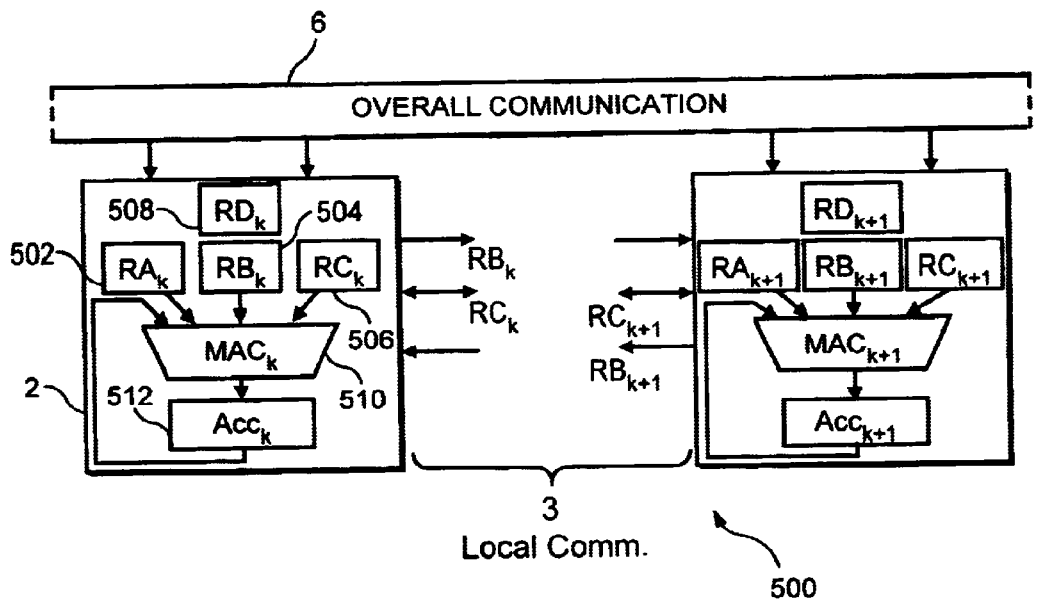
FIG. 5 is a schematic representation of a processing unit in accordance with the present invention.
FIG. 6 is a tabular representation of an overlapping design of three overlapping butterflies.
FIG. 7 is a tabular representation of the input/output proceeding of the processing unit.

These partial steps can now be computed with the aid of a processing unit as shown in FIG. 5. In order to achieve an overlapping execution at a later time, the values A, B and W as well as X and Y are read or written in respectively different clock cycles.

However, since reading also requires a re-sorting of the input data (as shown in FIG. 3), the read of values A and B is carried out either in the second or the third clock pulse, depending on the algorithmic requirement.

In that case, the following register allocations are carried out:

R1) $RC_k = W_{x,re'}$  ||  $RC_{k+1} = W_{x,im}$

R2/3) $RA_k = A_{re'} RB_k = B_{re'}$  ||  $RA_{k+1} = A_{im'} RB_{k+1} = B_{im}$

Processing is now carried out with the aid of these registers:

E1) $Acc_k = RA_k + RB_k * RC_k$  ||  $Acc_{k+1} = RA_{k+1} + RB_{k+1} * RC_k$

E2) $Acc_k = Acc_k - RB_{k-1} * RC_{k-1}$  ||  $Acc_{k+1} = Acc_{k+1} + RB_k * RC_{k+1}$

E3) $Acc_k = -Acc_k + RA_k * 2$  ||  $Acc_{k+1} = -Acc_{k+1} + RA_{k+1} * 2$

At the end, these results must be stored, where the first write cycle W1 must be carried out in parallel with the third processing step E3.

W1) Write $Acc_k || E3$

W2) Write $Acc_k$

In order to accelerate the processing, the stages read (R1–R3); compute (E1–E3); and write (W1–W2) operations can be carried out in an overlapping fashion, as shown in FIG. 6.

While butterfly i is being computed, the values of the next butterfly, i+1 can be read. However, one cannot overwrite any values which will still be needed in the computation of butterfly i.

FIG. 6 illustrates a utilization of each register for the overlapping cycles. In cycle 4 (R1; E1), RC is read in, even though the old value will still be needed in cycle 5 (R2/3; E2). Consequently, the old value is temporarily stored in RD. In the next cycle the value RA is read in, even though it will still be needed in cycle 6 (R2/3, E3). However in the latter cycle, register RC will no longer be needed. Consequently, register RC can take over the temporarily stored value of RD in cycle 5 (R2/3; E2), while RD can temporarily store the value of RA. In the last cycle 6 (R2/3, E3) the remaining strips are then loaded and register RD is transformed into register RA, as shown in FIG. 7.

A double strip such as shown in FIG. 5 contains two MAC units 510 which are connected via three links of the local communications unit 3 (which requires three buses). The data are conveyed via the overall communications unit 6.

Figure 9:
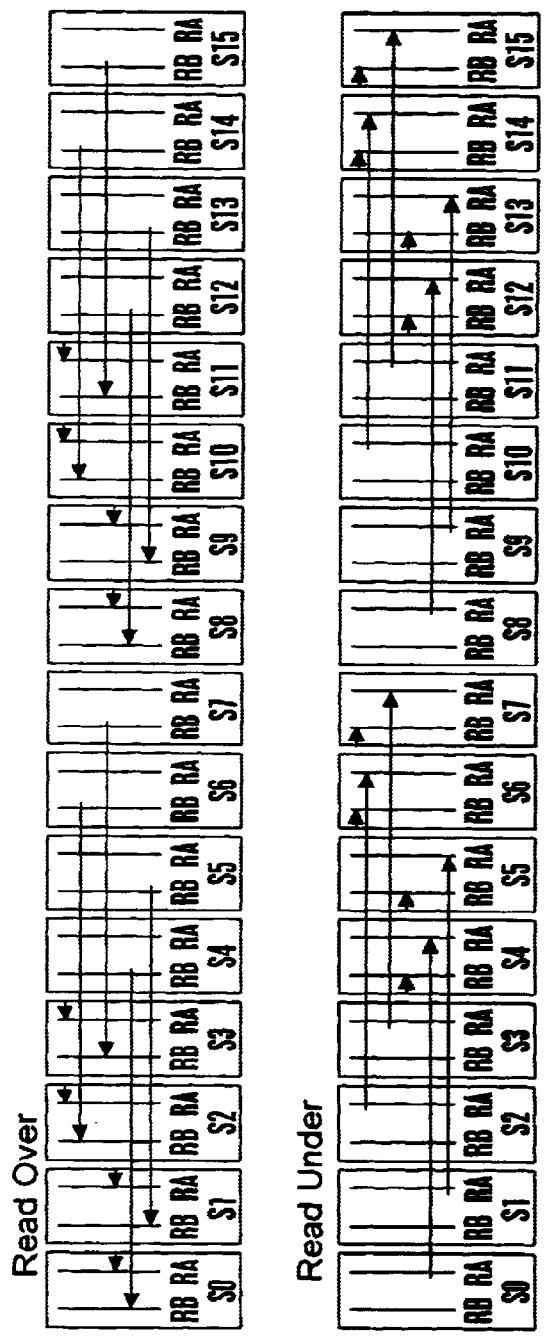
FIG. 9 is a representation of the required communications in stage 2.
Figure 10:
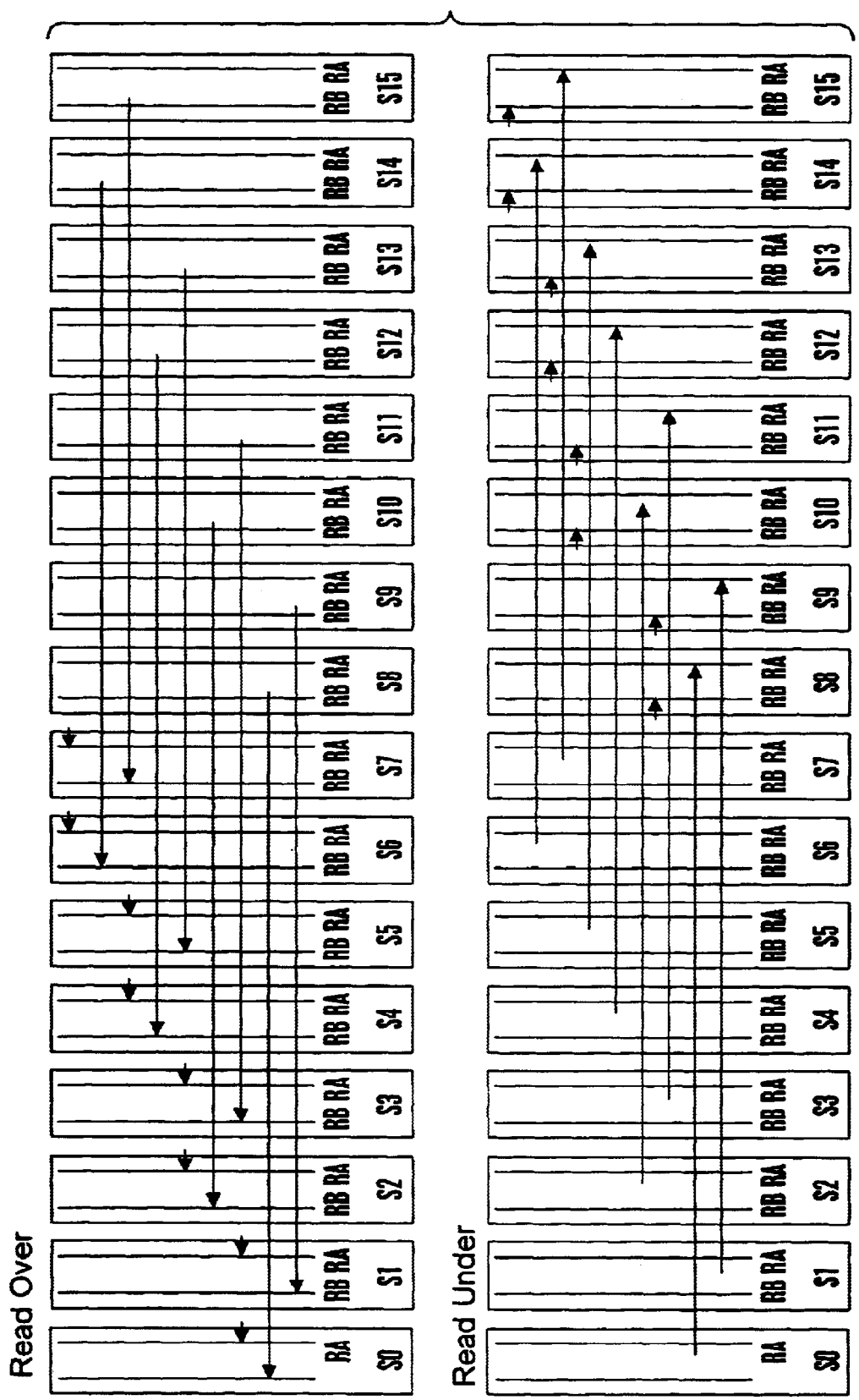
FIG. 10 is a representation of the required communications in stage 3.
Figure 11:
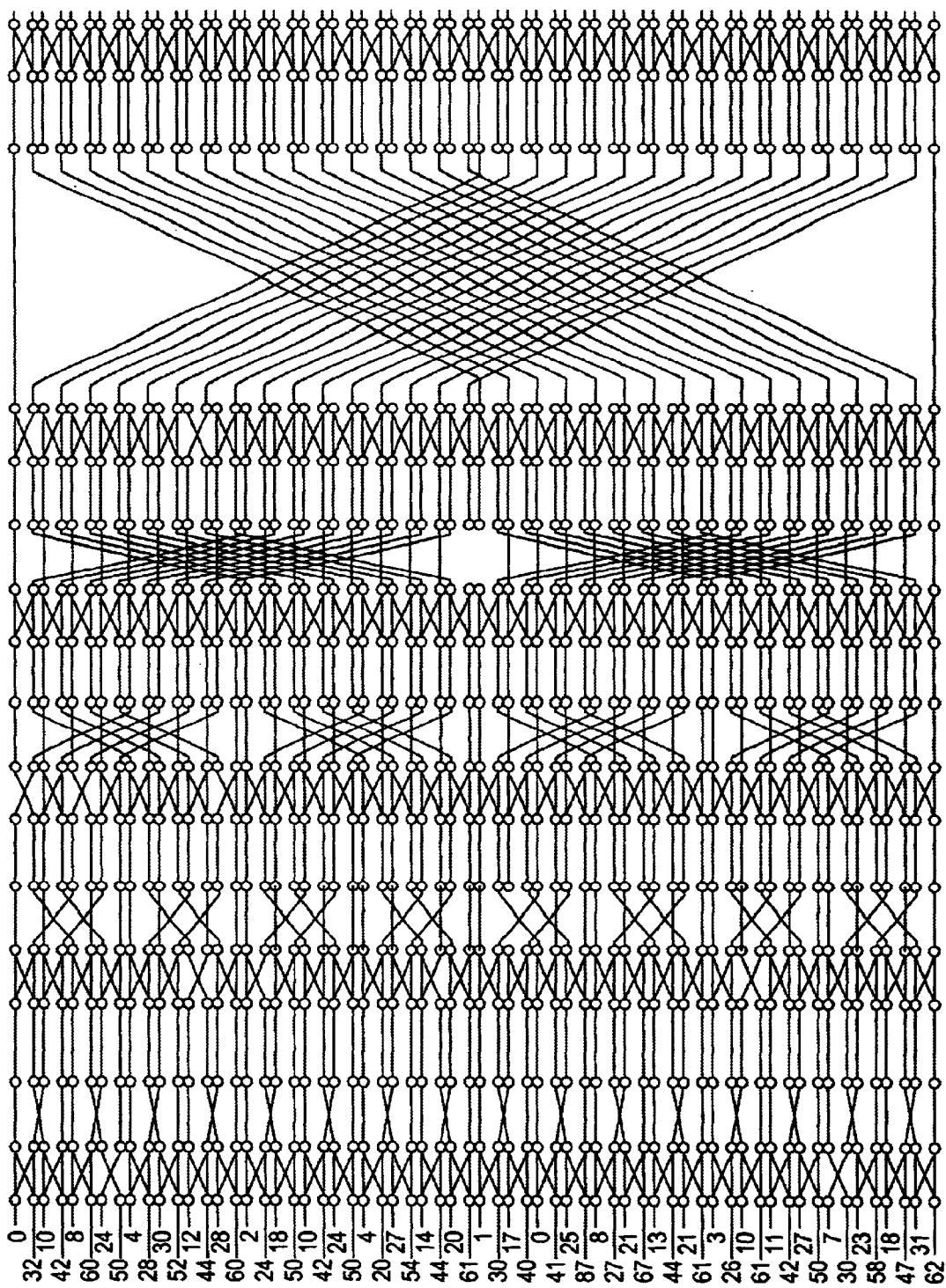
FIG. 11 is a representation of a 64-point FFT.

The above-mentioned procedure can be executed on a processor architecture with 16 strips. For descriptive purposes we will initially indicate (in FIGS. 8 through 10) the communications that are necessary for the computation of an FFT with 16 points or more. For an FFT with more than 16 points, however, these communications should only be carried out in the first three stages, as shown in FIG. 11. FIG. 8 shows, for stage 1 in FIG. 6, the communication for the read of a group in the upper and/or lower outputs of the butterfly. This is shown in FIG. 9 for stage 2, and in FIG. 10 for stage 3.

To read a group of 16 elements in each cycle, eight overall buses are used for the distribution of eight values in one clock pulse. Alternatively, these communications can also be carried out in eight cycles via one overall bus. Furthermore, communications can also be carried out through direct links or separated buses. This flexibility can be used for a cost-efficient implementation of the memory architecture, by adjusting the overall communications unit 6 to the respective requirement of the application.

Figure 12:
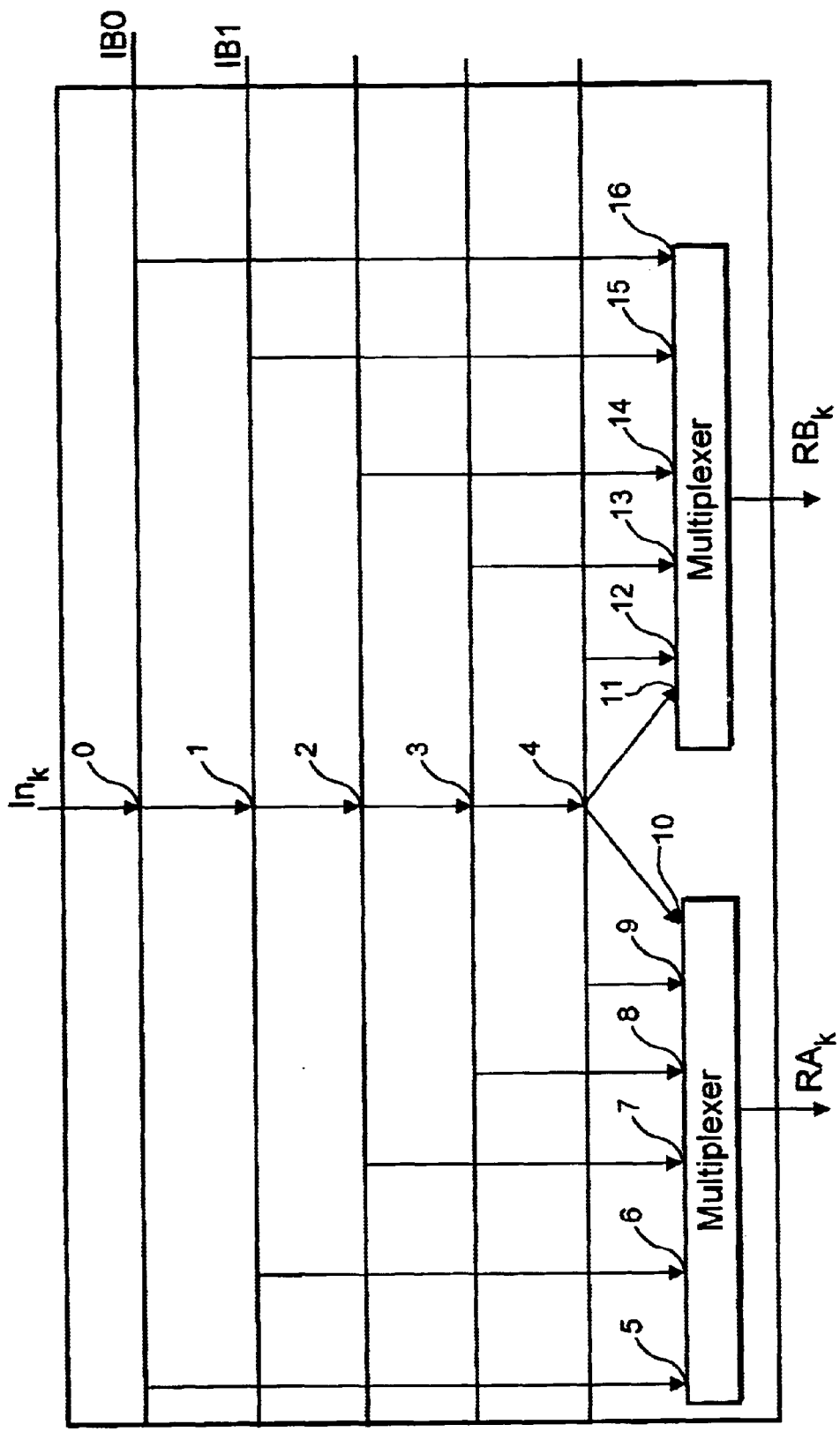
FIG. 12 is a schematic representation of a distributor in an overall communications unit for the k-th strip.

Inasmuch as the communication of eight values is not required in every stage of the FFT, and since the required communication in stage 1 (as shown in FIG. 8) can be carried out by means of a divided bus, there is provided in the overall communications unit 6 an overall and divided bus (not shown in detail). A distributor 8 is provided for the distribution of a strip over this bus structure, [the distributor] being shown in FIG. 12. Each input of the distributor 8 can be switched onto a divided bus IB0 or on four overall buses IB1–IBE4. Onto the registers RA or RB one can then switch either one of the five buses or the input itself As illustrated by the necessary communications according to FIG. 8, the required switchings are shown in the table in FIG. 13. Here, the columns represent the 16 strips of a so-called M3 architecture, while rows 1–7 designate the buses and row 3 the switching of the direct input. An M3 architecture designates an implementation of the switching arrangement according to the Invention with 16 strips.

In a second example of embodiment, a finite impulse response filter (hereinafter called FIR) is implemented. The FIR filter is one of the most important algorithms within digital signal processing, and one for which many digital signal processors (hereinafter called DSPs) are optimized for. This optimization can be carried out, for instance, via the multiply-accumulate unit by means of a tailor-made memory architecture or by special addressing modes.

For the parallelization of this FIR algorithm, the following applies:

$$Y_k = \overset{N-1}{\underset{i=0}{A}} a_i * X_{k-i}$$

For that purpose, there exist essentially two possibilities. On one hand, the summation itself can be split up according to the following relationship:

$$\sum_{i=0}^{\frac{N}{2}-1} a_i * X_{k-i} + \sum_{i=0}^{\frac{N}{2}-1} a_{i+\frac{N}{2}} * X_k.$$

In that case, the new sums can now be computed in separate and parallel fashion. The two partial sums must then be aggregated in one last step. The disadvantage of this method consists in the fact that different values are required for each summation. In this example, four input values must be conveyed simultaneously to the processing units in order to obtain a parallel switching.

If several output values [y₄] must be computed, these can also be computed simultaneously in different executing units:

$$Y_k = \sum_{i=0}^{N-1} a_i * X_{k-i} \quad (a)$$

$$Y_{k+1} = \sum_{i=0}^{N-1} a_i * X_{(k-1)-i} \quad (b)$$

Figures 13, 14, 15:
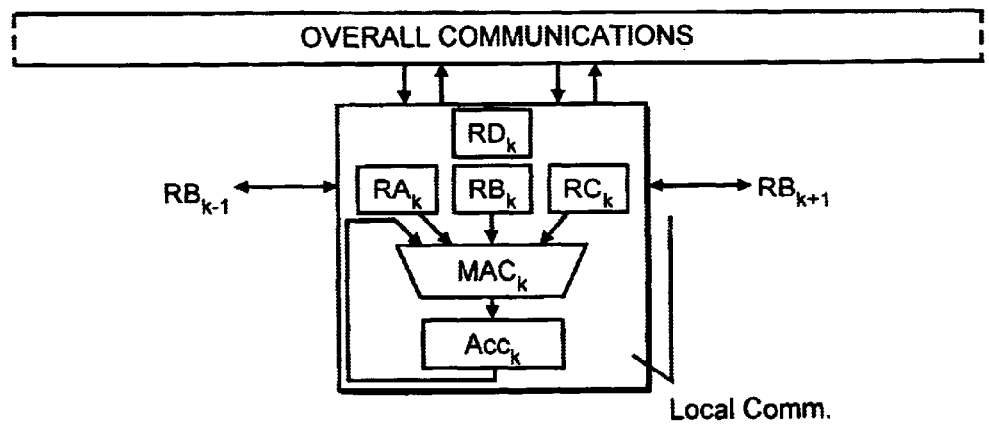
FIG. 13 is a representation of switches for the distributor.
FIG. 14 is a schematic representation of the structure of a strip with local communications units.
FIG. 15 is a representation of an overlapping design of two consecutive filter computations.

This arrangement has an advantage that, on one hand, the value $a_1$ can be simultaneously used, and on the other hand the value $x_{k-1}$ need only be read once, by using delay-line registers. This makes it possible to keep several processing units busy with only two memory accesses per clock pulse. If one now joins several $a_1$ or $x_{k-1}$ into groups, one must provided in one strip respectively one register for $a_i$ and/or $x_{k-1}$. In so doing, the input data must only be shifted to the left or right. In that case a strip with one MAC unit (which strip has respectively three registers) can serve as a processing unit. ($RB_k=x_k$, $RA_k=x_k+16$ $RC_k=C_k$). This is shown in FIG. 14.

If equations 3a and 3b are now to be carried out in parallel, both MACs can calculate with the same coefficients. This can be carried out via one overall bus, which distributes the same coefficient to all MACs. On the other hand, the values x must be shifted to the left or right with each cycle. This is done via a local communications unit 3, between two respectively adjacent MAC units 510.

As a result of this shifting, a register—either all the way left or all the way right—becomes free and contains no data. These must be loaded therein. The data can be loaded in groups from the group memory 7, which makes it impossible to access individual elements.

Consequently, the same group must be read into register(s) RC, which serve as intermediate memories. The position that becomes free is then filled with a value from this intermediate memory. This can be done by means of a second overall bus.

As in the case of the example of embodiment with the FFT, an overlapping execution as shown in FIG. 15 requires that the coefficients be temporarily stored in the delayed-line register RD. Thus, after cycle 17 one requires both a group of new coefficients and a group of new data values. If only one group per cycle can be loaded, the group of coefficients must be temporarily stored in cycle 16. Here again, this is done with the aid of a delayed-line register RD.

The overall buses can now be convolved with the overall buses required by the FFT algorithm. Depending on the requirements of the application, one can thus adjust and optimize the DSP architecture, by adjusting the overall communications unit.

In the case of the examples of embodiment of the FFT and FIR algorithms, one can thus convolve (and therefore use jointly) two buses of the overall communications unit 6; two buses of the local communications unit 3; four registers; the MAC unit; and the accumulator. Consequently, this Invention provides the basis for automated processor design.

In contrast to existing solutions, both architectures use one group memory 7 and can be built up in modular fashion via strip 1. Furthermore, the programming can be carried out via a SIMD (Single Instruction Multiple Data) procedure which distributes the same control signals to all strips 1 and thereby facilitates implementation and programming tasks.

What is claimed is:

1. A method for parallel data processing in which data are read out from a data memory and are conveyed via a communications unit to processing units for parallel processing, comprising:

dividing data into data groups with several elements stored under a common memory address;

allocating a processing unit to each element of a data group, with at least one element of the data group linked directly with the allocated processing unit; and reading a data group from data memory for processing in parallel by the processing units.

2. The method according to claim 1, further comprising the step of directly shifting data from the allocated processing units to other processing units.

3. The method of claim 1, wherein the elements of a data group are distributed via the communications unit to at least one processing unit.

4. The method of claim 3, wherein the elements of a data group are distributed via the communications unit to at least one processing unit.

5. The method of claim 4, wherein the elements are delayed before processing in the processing units until the arrival of a new element in a subsequent step.

6. The method of claim 1, wherein the elements are delayed before processing in the processing units until the arrival of a new element in a subsequent step.

7. A processor arrangement for parallel data processing, comprising:

a data memory, the data memory storing at least one data group with several elements under one address;

a communications unit coupled to the data memory and having a width which is smaller than the number of elements in one data group;

a plurality of parallel processing units, which are linked to each other via the communications unit, each processing unit including at least one process unit and a plurality of memory units which are arranged in a strip which is adjacent to at least one further strips with the same structure;

wherein each element of the data group is allocated a part of the overall communications unit and a processing unit and wherein the data memory is linked directly with the memory elements of an allocated processing unit in the width of a one element of one data group within one strip.

8. The processor arrangement for parallel data processing according to claim 7, wherein between processing units of adjacent strips there are arranged local communications units with a width of at least one and at most to twice the number of the memory elements in a processing unit.

9. The processor arrangement for parallel data processing according to claim 8, wherein the memory elements are designed as registers.

10. The processor arrangement for parallel data processing according to claim 7, wherein the memory elements are designed as registers.

11. The processor arrangement according to claim 10, wherein the width of the communications unit is equal to 0, the data memory is designed as a group memory in which at least one data group with several elements is stored under one address, each element of the data group is allocated a processing unit consisting of a plurality of process units and a plurality of memory units which are arranged in a strip which is adjacent to further strips with the same structure; and the data memory is directly linked with the memory elements of an allocated processing unit in the width of one element of one data group within one strip.

12. The processor arrangement according to claim 7, wherein the width of the communications unit is equal to 0, the data memory is designed as a group memory in which at least one data group with several elements is stored under one address, each element of the data group is allocated a processing unit consisting of a plurality of process units and a plurality of memory units which are arranged in a strip which is adjacent to further strips with the same structure; and the data memory is directly linked with the memory elements of an allocated processing unit in the width of one element of one data group within one strip.

* * * * *